US 8,556,492 B2

United States Patent
Joung et al.

(10) Patent No.: US 8,556,492 B2
(45) Date of Patent: Oct. 15, 2013

(54) BACKLIGHT UNIT AND DISPLAY APPARATUS INCLUDING THE SAME

(75) Inventors: Juyoung Joung, Pyeongtaek-si (KR); Seungse Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 12/956,679

(22) Filed: Nov. 30, 2010

(65) Prior Publication Data

US 2011/0221785 A1    Sep. 15, 2011

Related U.S. Application Data

(60) Provisional application No. 61/405,321, filed on Oct. 21, 2010.

(30) Foreign Application Priority Data

Mar. 15, 2010  (KR) .................. 10-2010-0022630
Mar. 15, 2010  (KR) .................. 10-2010-0022736

(51) Int. Cl.
F21V 7/04   (2006.01)
G09F 13/04  (2006.01)
G02F 1/1335 (2006.01)

(52) U.S. Cl.
USPC .......... 362/616; 362/613; 362/608; 362/97.1; 349/61; 349/62; 349/65; 349/69

(58) Field of Classification Search
USPC ........ 362/616, 611, 612, 613, 608, 97.1, 607; 349/61, 62, 65, 69
See application file for complete search history.

(56) References Cited

U.S. PATENT DOCUMENTS

| | | | |
|---|---|---|---|
| 7,059,754 B2 * | 6/2006 | Lekson et al. | 362/545 |
| 7,470,046 B2 * | 12/2008 | Kao et al. | 362/332 |
| 7,534,026 B2 * | 5/2009 | Uehara et al. | 362/613 |
| 7,588,364 B2 * | 9/2009 | Kitamura et al. | 362/616 |
| 7,616,271 B2 * | 11/2009 | Souk et al. | 349/65 |

(Continued)

FOREIGN PATENT DOCUMENTS

| | | |
|---|---|---|
| JP | 2001-312916 A | 11/2001 |
| JP | 2008-108622 A | 5/2008 |
| JP | 2008-108623 A | 5/2008 |
| JP | 2009-272096 A | 11/2009 |

OTHER PUBLICATIONS

International Search Report dated Aug. 30, 2011 issued in Application No. PCT/KR2010/008268.

*Primary Examiner* — David J Makiya
*Assistant Examiner* — Bryon T Gyllstrom
(74) *Attorney, Agent, or Firm* — KED & Associates, LLP

(57) ABSTRACT

Provided are a backlight unit and a display apparatus including the backlight unit. The backlight unit includes light sources, light guide plates, and a bottom cover. The light sources emit light in a first direction. The light guide plates have first sides spaced a predetermined distance in the first direction from each other and facing each other. The light guide plates at least partially overlap each other. The light emitted from the light source is incident in the first direction to the first side and emitted in a second direction crossing the first direction. The bottom cover receives the light source and the light guide plate and includes a side border facing a second side of the light guide plate spaced apart from the first side of the light guide plate by an extension length of the light guide plate in the first direction.

26 Claims, 10 Drawing Sheets

(56) References Cited

U.S. PATENT DOCUMENTS

| | | | |
|---|---|---|---|
| 7,826,698 B1* | 11/2010 | Meir et al. | 385/31 |
| 8,002,454 B2* | 8/2011 | Chen et al. | 362/613 |
| 2006/0114690 A1* | 6/2006 | Iki et al. | 362/612 |
| 2007/0247871 A1* | 10/2007 | Yoo | 362/612 |
| 2008/0151142 A1* | 6/2008 | Noba | 349/65 |
| 2008/0211987 A1* | 9/2008 | Kim et al. | 349/61 |
| 2009/0290093 A1* | 11/2009 | Shimura et al. | 349/62 |
| 2009/0290094 A1* | 11/2009 | Shimura et al. | 349/62 |

* cited by examiner

BACKLIGHT UNIT AND DISPLAY APPARATUS INCLUDING THE SAME

CROSS-REFERENCE TO RELATED APPLICATIONS

The present application claims priority under 35 U.S.C. 119 and 35 U.S.C. 365 to Korean Patent Application Nos. 10-2010-0022736 and 10-2010-0022630 (filed on 15 Mar., 2010), which are hereby incorporated by reference in its entirety.

BACKGROUND

The present disclosure relates to a backlight unit and a display apparatus including the backlight unit.

As our information society develops, needs for diverse forms of display apparatuses are increasing. Accordingly, research has been carried out on various display apparatuses such as liquid crystal display devices (LCDs), plasma display panels (PDPs), electro luminescent displays (ELDs), and vacuum fluorescent displays (VFDs), which have been commercialized.

Of these, an LCD has a liquid crystal panel that includes a liquid crystal layer, a thin film transistor (TFT) substrate, and a color filter substrate facing the TFT substrate with the liquid crystal layer therebetween. Such a liquid crystal panel, having no light source, uses light provided by a backlight unit to display an image.

SUMMARY

Embodiments provide a backlight unit and a display apparatus including the backlight unit, which improve quality of a display image.

In one embodiment, a backlight unit includes: a plurality of light sources configured to emit light in a first direction; a plurality of light guide plates having first sides spaced a predetermined distance in the first direction from each other and facing each other, the light guide plates at least partially overlapping each other, the light emitted from the light source being incident in the first direction to the first side and emitted in a second direction crossing the first direction; and a bottom cover receiving the light source and the light guide plate and including a side border facing a second side of the light guide plate spaced apart from the first side of the light guide plate by an extension length of the light guide plate in the first direction.

In another embodiment, a display apparatus includes: a display panel; a backlight unit disposed at a rear side of the display panel and including a plurality of separately drivable driving areas; and a driving part driving at least one of the display panel and the backlight unit and disposed at a rear side of the backlight unit, wherein the backlight unit includes: a plurality of light sources configured to emit light in a first direction; a plurality of light guide plates having first sides spaced a predetermined distance in the first direction from each other and facing each other, the light guide plates at least partially overlapping each other, the light emitted from the light source being incident in the first direction to the first side and emitted in a second direction crossing the first direction; and a bottom cover receiving the light source and the light guide plate and including a side border facing a second side of the light guide plate spaced apart from the first side of the light guide plate by an extension length of the light guide plate in the first direction.

The details of one or more embodiments are set forth in the accompanying drawings and the description below. Other features will be apparent from the description and drawings, and from the claims.

DETAILED DESCRIPTION OF THE EMBODIMENTS

Figure 1:
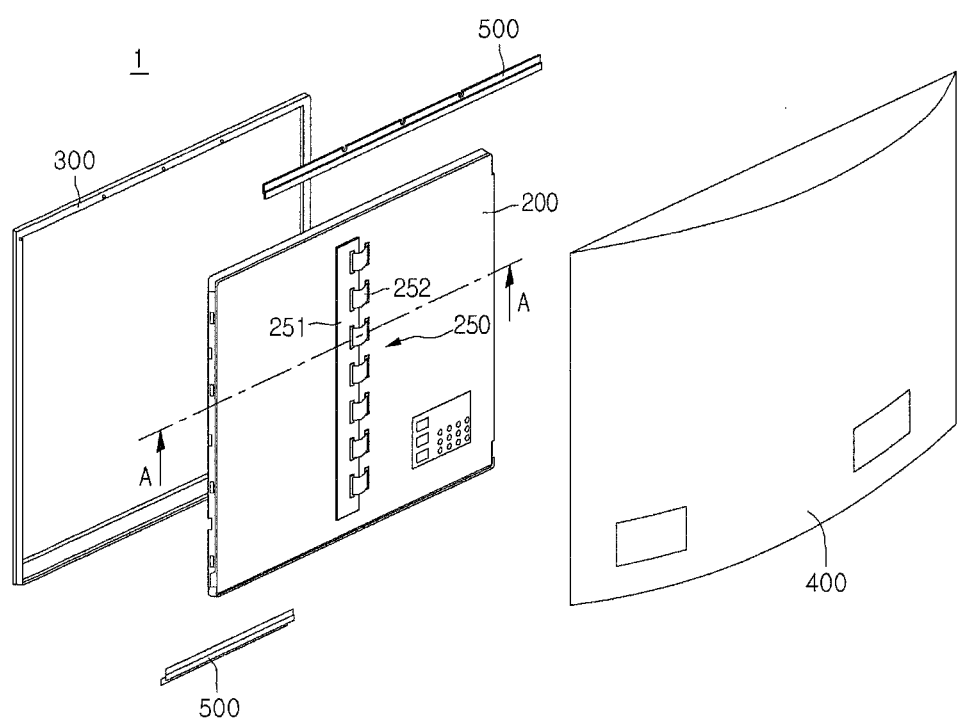
FIG. 1 is an exploded perspective view illustrating a display apparatus according to an embodiment.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. In the drawings, the shapes and sizes of elements are exaggerated for clarity.

FIG. 1 is an exploded perspective view illustrating a display apparatus 1 according to an embodiment.

Referring to FIG. 1, the display apparatus 1 includes a display module 200, a front cover 300 and a back cover 400 that surround the display module 200, and a fixing member 500 for fixing the display module 200 to at least one of the front cover 300 and the back cover 400.

A portion of the fixing member 500 is fixed to the front cover 300 through a coupling member such as a screw, and then, another portion of the fixing member 500 supports the display module 200 with respect to the front cover 300, so that the display module 200 can be fixed with respect to the front cover 300.

Although the fixing member 500 has an elongated plate shape in the current embodiment, the display module 200 may be fixed to the front cover 300 or the back cover 400 through a coupling member without the fixing member 500.

Figure 2:
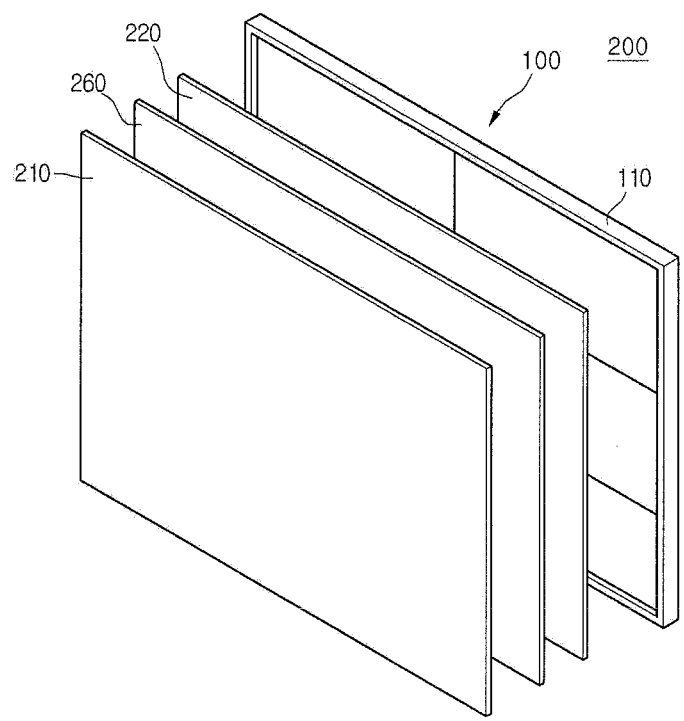
FIG. 2 is an exploded perspective view illustrating a display module of FIG. 1.
Figure 3:
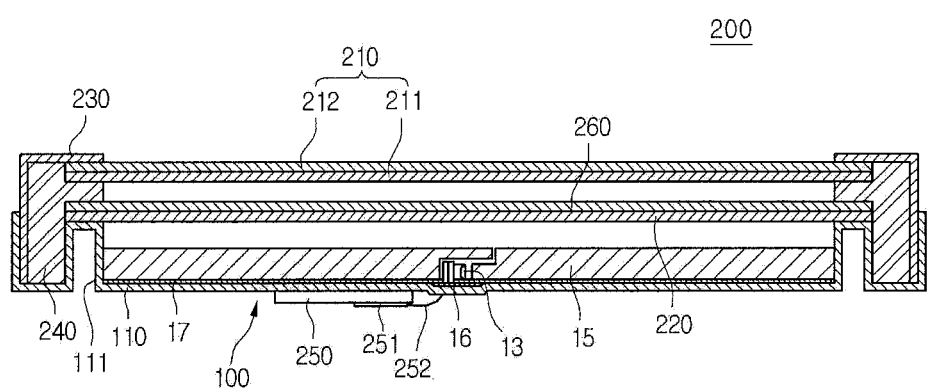
FIG. 3 is a cross-sectional view taken along line A-A of FIG. 1.

FIG. 2 is an exploded perspective view illustrating the display module 200 of FIG. 1. FIG. 3 is a cross-sectional view taken along line A-A of FIG. 1.

Referring to FIGS. 1 to 3, the display module 200 includes a display panel 210 for displaying an image, a backlight unit 100 emitting light to the display panel 210, a panel supporter 240 supporting the inner surface of the display panel 210, a top cover 230 supporting a surface of the display panel 210 and constituting a border of the display module 200, and a bottom cover 110 constituting the lower appearance of the display module 200.

The bottom cover 110 may include a side border 111 to receive components of the backlight unit 100 and have a box shape with an open upper surface. A side border of the top cover 230 may be fixed to the side border 111. For example, a coupling member such as a screw may pass through a side surface of the display module 200, that is, through a side where the bottom cover 110 overlaps the top cover 230 to fix the bottom cover 110 and the top cover 230. The bottom cover 110 may be a component of the backlight unit 100 to receive the components of the backlight unit 100.

A portion of the top cover 230 surrounds a front border of the display panel 210, and another portion of the top cover 230 is bent from the first portion, and is fixed to the bottom cover 110.

The panel supporter 240 is disposed between the top cover 230 and the bottom cover 110. A portion of the panel supporter 240 protrudes, and a rear border of the display panel 210 is placed on a protrusion surface of the panel supporter 240.

A rear side of the bottom cover 110 is provided with at least one driving substrate 250 to drive the display module 200 with a signal transmitted from the outside, e.g. an image signal.

The driving substrate 250 may be, e.g., a driving part of an image panel and/or a backlight unit such as a timing controller, a T-con board, a power supply device, or a main printed circuit board (PCB), and fixed to the rear surface of the bottom cover 110 through an adhesive member or a coupling member such as a screw.

For example, the display panel 210 may include a lower substrate 211 and an upper substrate 212 attached to each other with a constant cell gap, and a liquid crystal layer interposed between the lower substrate 211 and the upper substrate 212. The lower substrate 211 is provided with a plurality of gate lines and a plurality of data lines crossing the gate lines. Thin film transistors (TFTs) may be disposed in crossing areas of the gate lines and the data lines.

The upper substrate 212 may be provided with color filters. However, the structure of the display panel 210 is not limited thereto. For example, the lower substrate 211 may include color filters as well as TFTs. In addition, the structure of the display panel 210 may be varied according to a method of driving the liquid crystal layer.

Although not shown, an edge of the display panel 210 may be provided with a gate driving printed circuit board (PCB) supplying scan signals to the gate lines, and a data driving PCB supplying data signals to the data lines. One of the upper and lower sides of the display panel 210 may be provided with a polarized light filter (not shown).

The backlight unit 100 includes a plurality of light sources 13 configured to emit light in a first direction (z-axis direction), a plurality of light guide plates 15 configured to emit light incident from the light sources 13 in a second direction (y-axis direction) crossing the first direction, that is, to the display panel 210, the bottom cover 110 receiving the light sources 13 and the light guide plates 15, a reflecting sheet 17 disposed between the light guide plates 15 and the bottom cover 110, and a heat dissipation member 16 disposed between the light sources 13 and the bottom cover 110 to emit heat from the light sources 13 to the bottom cover 110. The backlight unit 100 may include a spread plate 220 disposed between the inner surface of the display panel 210 and a surface of the light guide plate 15 to improve the uniformity of light emitted from the light guide plate 15 in the second direction, and a plurality of optical sheets 260 configured to process light.

The light sources 13 and the light guide plates 15 are fixed to the bottom cover 110. A portion of the bottom cover 110 where the light sources 13 are disposed may be provided with a plurality of through holes (not shown) through which driving cables 252 connecting a driving device 251 of the driving substrate 250 to the light sources 13 pass.

The spread sheet 220 uniformly spreads light emitted from the light guide plate 15, and the spread light may be collected to the display panel 210 through the optical sheet 260 such as a prism sheet. The prism sheet including one or more illumination enhancement films and at least one of a horizontal prism sheet and a vertical prism sheet may be selectively provided.

The spread sheet 220 and the optical sheet 260 may be placed and fixed in a region where the border of the bottom cover 110 protrudes to the display panel 210.

The light guide plate 15 and the light source 13 of the backlight unit 100 are provided in plurality to be classified into a plurality of division areas having different illumination values according to a contrast ratio of an image signal displayed on the display panel 210 disposed at the front side of the backlight unit 100.

That is, the display panel 210 may have a plurality of division areas corresponding to the light guide plates 15. The intensity of light emitted from the light guide plate 15 of the optical assembly 10, that is, the brightness of light emitted from the light guide plate 15 is adjusted according to a gray peak value or a color coordinate signal of the corresponding division area, so as to adjust the brightness of the display panel 210.

Hereinafter, the backlight unit 100 will now be described in detail.

Figure 4:
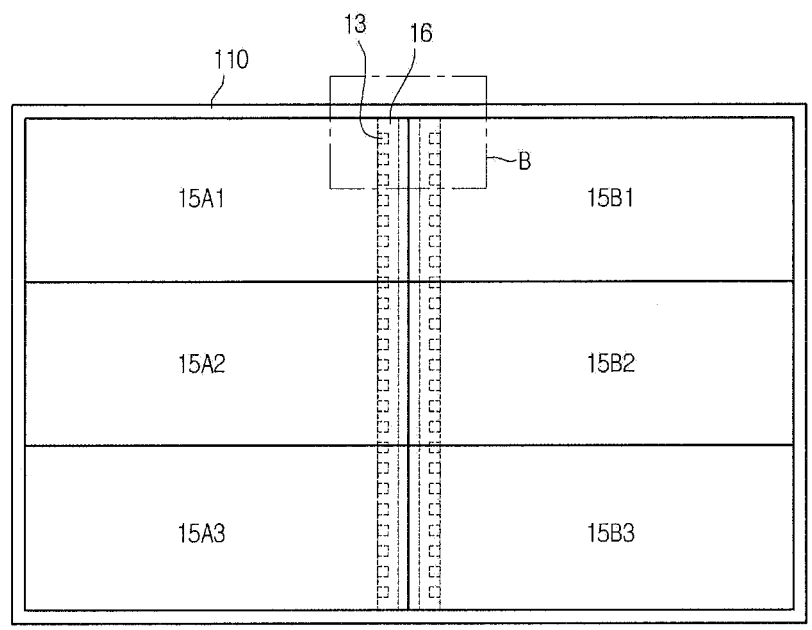
FIG. 4 is a plan view illustrating the display module of FIG. 1 when liquid crystal panels are removed
Figure 5:
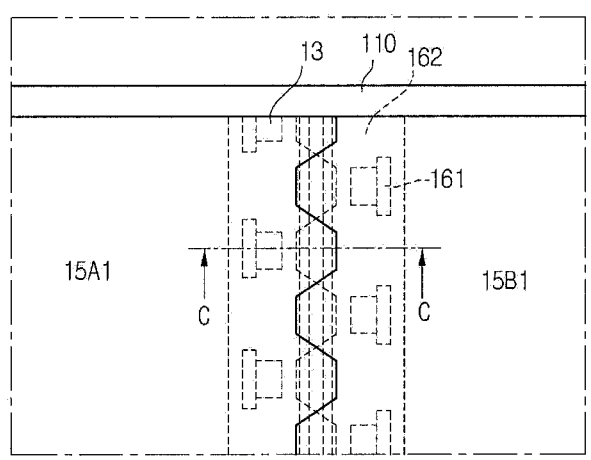
FIG. 5 is an enlarged view illustrating a portion B of FIG. 4.

FIG. 4 is a plan view illustrating the display module 200 of FIG. 1 when a liquid crystal panel and optical films are removed, and FIG. 5 is an enlarged view illustrating a portion B of FIG. 4.

Referring to FIGS. 4 and 5, the light guide plates 15 of the backlight unit 100 may include, for example, a first light guide plate 15A1, a second light guide plate 15A2, a third light guide plate 15A3, a fourth light guide plate 15B1, a fifth light guide plate 15B2, and a sixth light guide plate 15B3, which are arrayed in a first column A and a second column B in first to third rows.

At least one portion of the first to third light guide plates 15A1, 15A2, and 15A3 arrayed in the first column A overlaps at least one portion of the fourth to sixth light guide plates 15B1, 15B2, and 15B3 arrayed in the second column B.

Other portions of the first to sixth light guide plates 15A1, 15A2, 15A3, 15B1, 15B2, and 15B3 face the side border 111 of the bottom cover 110.

That is, the first to third light guide plates 15A1, 15A2, and 15A3 arrayed in the first column A are symmetrical to the fourth to sixth light guide plates 15B1, 15B2, and 15B3 arrayed in the second column B with respect to the central side of the bottom cover 110 where the light sources 13 are arrayed.

The light guide plate 15 may be formed of a transparent material, and may include, for example, one of acrylic resin such as polymethyl metaacrylate (PMMA), polyethylene terephthalate (PET), poly carbonate (PC), and polyethylene naphthalate (PEN) resin. The light guide plate 15 may be formed using an extrusion molding method.

The light guide plates 15 diffuse light incident from the light sources 13 to guide the light to be emitted upward.

That is, the backlight unit 100 is operated by a plurality of division driving areas corresponding to the light guide plates 15, and the brightness of the division driving area is linked with brightness corresponding to an image signal. Thus, the brightness in a dark portion of an image is decreased, and the brightness in a bright portion of the image is increased, so as to improve a contrast ratio and sharpness of the image.

The division driving area corresponding to one of the light guide plates 15 may be divided into a plurality of sub division driving areas corresponding to the light sources 13 providing light to the light guide plate 15.

In this case, the light sources 13 corresponding to the sub division driving areas may be operated according to a light source group including at least one of the light sources 13.

The light sources 13 are arrayed in two lines at the central side of the bottom cover 110. A light emitting surface of the light sources 13 arrayed in one line is directed to the opposite side to that of the light sources 13 arrayed in the other line. The light sources 13 arrayed in one line are disposed alternately with the light sources 13 arrayed in the other line.

The light sources 13 are disposed between a side of the light guide plate 15 and the bottom cover 110 to emit light to the light guide plate 15, and are fixed to the heat dissipation member 16 fixed to the bottom cover 110.

For example, the heat dissipation member 16 is formed of a metal having a high heat conductivity coefficient such as aluminum, and is fixed to the bottom cover 110. The heat dissipation member 16 includes a bottom cover side fixation part 161, and a light source side fixation part 162 protruding in the manner of bending from the bottom cover side fixation part 161. The light sources 13 are fixed to the light source side fixation part 162. In this case, heat emitted from the light sources 13 is transferred through the heat dissipation member 16 to the bottom cover 110, so that the heat is emitted out of the backlight unit 100.

The heat dissipation member 16 according to the current embodiment may include two members that correspond respectively to the two lines of the light sources 13, and further, the number of the members of the heat dissipation member 16 may be varied to correspond to the number of lines in which the light sources 13 are arrayed.

A side of the light guide plate 15 is provided with a mechanical and optical configuration that engages with the adjacent light guide plate 15 and uniformly spreads light emitted from the light sources 13.

Hereinafter, the configuration of the light guide plates 15 will now be described in detail.

Figure 6:
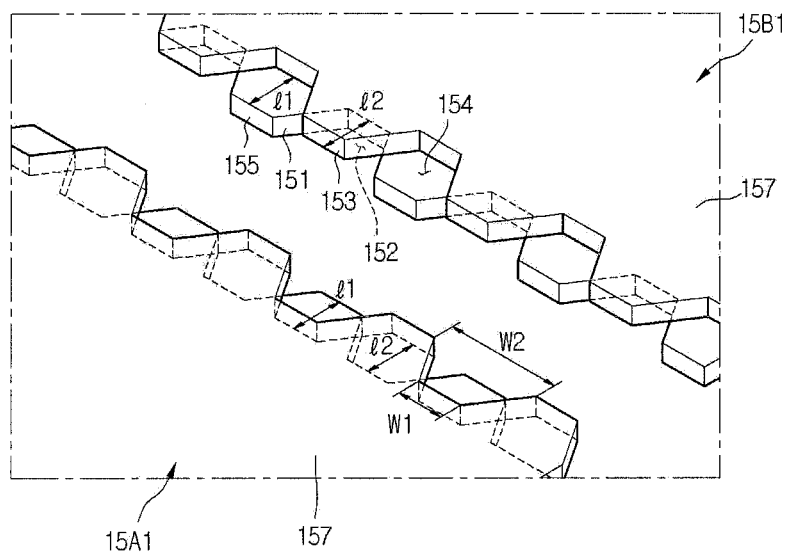
FIG. 6 is a schematic view illustrating light guide plates engaging with each other according to the embodiment of FIG. 1.

FIG. 6 is a schematic view illustrating the light guide plates 15 engaging with each other. Referring to FIG. 6, a side of the first light guide plate 15A1 arrayed in the first column and a side of the second light guide plate 15B1 arrayed in the second column are illustrated.

Referring to FIG. 6, the light guide plate 15 includes a plurality of light incident parts 151 disposed at a first side of the light guide plate 15 and facing the light emitting surface of the light sources 13 and having light incident surfaces 155 to which light is incident from the light sources 13, a plurality of shield parts 153 covering the light incident parts 151 of another adjacent light guide plate 15, and a light emitting part 157 extending from a second side of the light incident parts 151 to a second side of the light guide plate 15. First engagement spaces 152 and second engagement spaces 154 are disposed between the light incident parts 151 and the shield parts 153 to receive the light incident parts 151 and the shield parts 153 of another one of the light guide plates 15.

In more detail, the light incident parts 151 and the shield parts 153 protrude from a first side of the light emitting part 157 to another one of the light emitting parts 157. For example, the light incident parts 151 and the shield parts 153 have a wedge shape that decreases in a cross section from the first side of the light emitting part 157. For example, the light incident surface 155 disposed at a first side of the light incident parts 151 may be greater than the light emitting surface of the light sources 13.

The light incident parts 151 are alternately disposed with the shield parts 153. The light incident parts 151 are disposed at a different height from that of the shield parts 153, that is, the light incident parts 151 are disposed lower than the shield parts 153. Thus, the light incident parts 151 and the shield parts 153 may be disposed at different heights on the first side of the light guide plates 15, so as to form a stratified structure.

An extension length l1 that the light incident parts 151 protrudes from the first side of the light emitting part 157 is smaller than an extension length l2 of the shield parts 153. Thus, for example, when a first side of the first light guide plate 15A1 engages with a first side of the fourth light guide plate 15B1, the light incident parts 151 of the first light guide plate 15A1 are spaced a constant distance from the first side of the light emitting parts 157 of the fourth light guide plate 15B1, thereby forming a light source receiving space S (refer to FIG. 7) in which the light sources 13 emitting light to the light incident parts 151 are disposed.

When the light sources 13 and the light source side fixation part 162 of the heat dissipation member 16 are disposed in the light source receiving space S, a side of the light emitting part 157 of the light guide plate 15, an inner surface of the shield parts 153, and the light incident surface 155 of the light incident parts 151 of adjacent one of the light guide plates 15 are spaced predetermined distances from the light source 13 and the light source side fixation part 162 of the heat dissipation member 16, and surround the light source 13 and the light source side fixation part 162 of the heat dissipation member 16.

A width w1 of the first engagement spaces 152 and a width w2 of the second engagement spaces 154 increase in a direction going away from the first side of the light emitting part 157, so as to have wedge shapes corresponding to the light incident parts 151 and the shield parts 153.

Hereinafter, an arrangement of the light sources 13 relative to the light guide plates 15 will now be described in detail.

Figure 7:
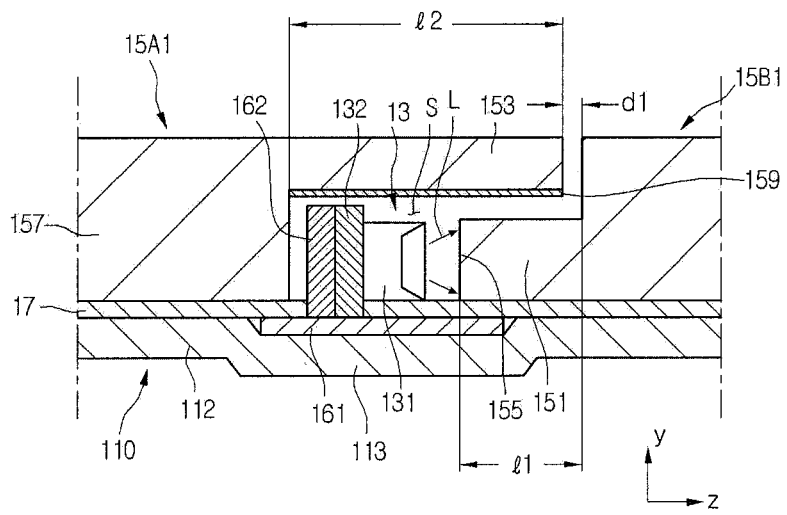
FIG. 7 is a cross-sectional view taken along line C-C of FIG. 5.

FIG. 7 is a cross-sectional view taken along line C-C of FIG. 5.

Referring to FIG. 7, for example, when the first and second light guide plates 15A1 and 15B1 having the first sides facing each other and engaging with each other, the shield part 153 of the first light guide plate 15A1 is spaced apart from the upper side of the light incident part 151 of the fourth light guide plate 15B1, that is, spaced apart therefrom in the second direction (y-axis direction).

That is, the first side of the light guide plate 15 disposed along any one column overlaps the first side of the light guide plate 15 disposed along another adjacent column.

The shield part 153 of the first light guide plate 15A1 is inserted in the second engagement space 154 of the fourth light guide plate 1581, and is spaced a distance d1 from the first side of the light emitting part 157 of the fourth light guide plate 15B1. Thus, when the light guide plates 15 adjacent to each other are thermally expanded by heat emitted from the light sources 13, damages due to direct contacts between the light guide plates 15 can be prevented.

The light source 13 and the heat dissipation member 16 are disposed in the space where the light incident part 151 of the first light guide plate 15A1 is spaced a predetermined distance from the first side of the light emitting part 157 of the fourth light guide plate 15B1.

As described above, the heat dissipation member 16 is formed of a metal having a high heat conductivity coefficient such as aluminum, and is fixed to the bottom cover 110. The heat dissipation member 16 includes the bottom cover side fixation part 161, and the light source side fixation part 162 protruding in the manner of bending from the bottom cover side fixation part 161. The light sources 13 are fixed to the light source side fixation part 162.

The bottom cover side fixation part 161 is fixed to a receiving part 112 of the bottom cover 110 receiving the light guide plates 15, the light sources 13, and the heat dissipation member 16. The receiving part 112 is provided with a recess part 113 recessed a predetermined depth in a region to which the light source side fixation part 162 is fixed. For example, a recess depth of the recess part 113 may correspond to the thickness of the light source side fixation part 162.

The light source side fixation part 162 protrudes a predetermined height in the second direction (y-axis direction) from a surface of the bottom cover side fixation part 161. The light sources 13 are fixed to a first surface of the light source side fixation part 162. In this case, the first surface of the light source side fixation part 162 faces the light incident surface 155 of the light guide plate 15.

The light sources 13 may be light emitting diodes (LEDs), and includes light emitting parts 131 configured to emit light and a substrate 132 to which the light emitting parts 131 are fixed and an operation signal for the light emitting parts 131 is input.

The LED may be a side illumination-type LED that is configured to laterally emit light. The LED may also be a color LED emitting at least one of red, blue, and green light, or a white LED in which a yellow fluorescent material is applied to a blue LED.

The LEDs may be disposed on the upper surface of the substrate 14, and may emit light having a wavelength ranging from about 430 to 480 nm. A fluorescent material may be applied on a light emitting surface of the LED to emit light from the LED.

The inner surface of the substrate 132 is fixed to the first surface of the light source side fixation part 162, and light emitted from the light sources 13 is incident in the first direction (z axis direction) to the light incident surface 155 of the fourth light guide plate 15B1.

The light sources 13 may be constituted by top-view type LEDs configured to emit light perpendicularly to the first surface of the substrate 132, or be constituted by side-view type LEDs configured to emit light in a parallel direction to the first surface of the substrate 132 according to a configuration that the light sources 13 are installed on the light guide plate 15.

In this case, the light sources 13 may emit light L to have a predetermined orientation angle from the first direction, and the light emitting surfaces of the light emitting parts 131 of the light sources 13 are spaced a predetermined distance from the light incident surfaces 155 of the light guide plate 15.

The light sources 13 configured to emit light to the light incident part 151 of one of the light guide plates 15 are disposed between the shield part 153 of another adjacent one to the light guide plate 15 and the receiving part 112 of the bottom cover 110, so that light emitted from the light sources 13 is prevented from being emitted out of the backlight unit 100 without passing through the light guide plate 15.

That is, for example, the light sources 13 configured to emit light to the shield part 153 of the fourth light guide plate 15B1 are disposed between the shield part 153 of the first light guide plate 15A1 and the receiving part 112 of the bottom cover 110.

A light shield member 159 having a predetermined light-transmitting value is disposed between the light source 13 and the shield part 153 to prevent light from being directly emitted to the outside through the shield part 153 from the light source 13.

Referring again to FIGS. 5 and 7, since the light source receiving spaces S are discretely, not continuously, formed by the light guide plate 15, the light sources 13 and the light source side fixation part 162 of the heat dissipation member 16 to which the light sources 13 are fixed are also formed discretely.

One of the light sources 13 is disposed in one of the light source receiving spaces S of the backlight unit 100, but the light sources 13 may be disposed in one of the single light source receiving space S of the backlight unit 100 in the current embodiment.

A reflecting member (also denoted by 17) is disposed between the light guide plate 15 and the receiving part 112 of the bottom cover 110 to reflect or emit light incident to the light guide plate 15 in the second direction.

For example, the reflecting member 17 may be constituted by a sheet having higher reflectivity than that of a surrounding thereof, and through holes through which the light sources 13 and the light source side fixation part 162 of the heat dissipation member 16 pass may be discretely formed in the reflecting member 17.

The light guide plates 15 of the backlight unit 100 are spaced a predetermined distance from the portion where the light source receiving spaces S are formed, and the portion where the first sides of the light guide plates 15 are spaced apart from one another is lower in transmissivity than the other portions, and thus, dark regions are generated.

Thus, the backlight unit 100 includes the spread plate 220 to prevent the dark regions due to the spaces between the light guide plates 15.

Hereinafter, the spread plate 220 of the backlight unit 100 will now be described in detail.

Figure 8:
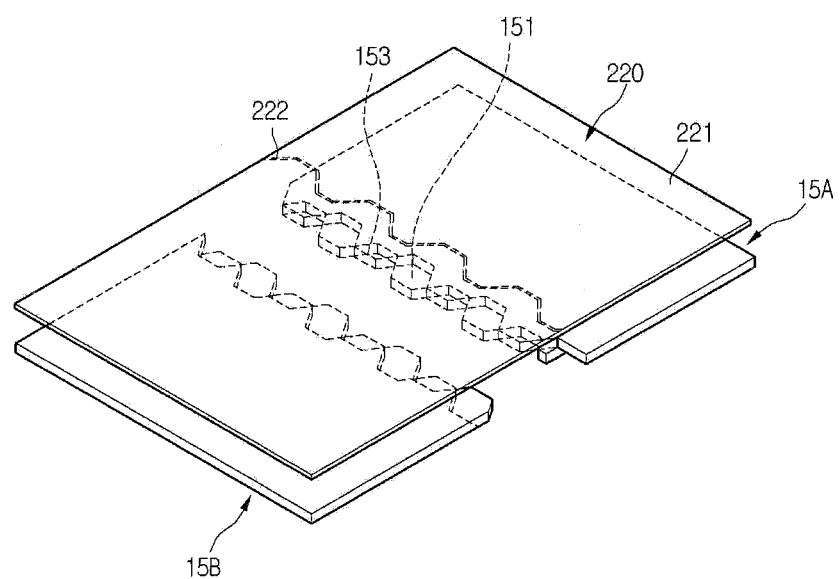
FIG. 8 is a schematic view illustrating the light guide plates and a spread plate according to the embodiment of FIG. 1.

FIG. 8 is a schematic view illustrating the light guide plates 15 and the spread plate 220.

Referring to FIGS. 3 and 8, the spread plate 220 is disposed on the upper side of the light guide plates 15, that is, between the light guide plates 15 and the display panel 210 to spread the light L emitted in the second direction from the light guide plates 15, so that the light L have uniform brightness.

Figure 9:
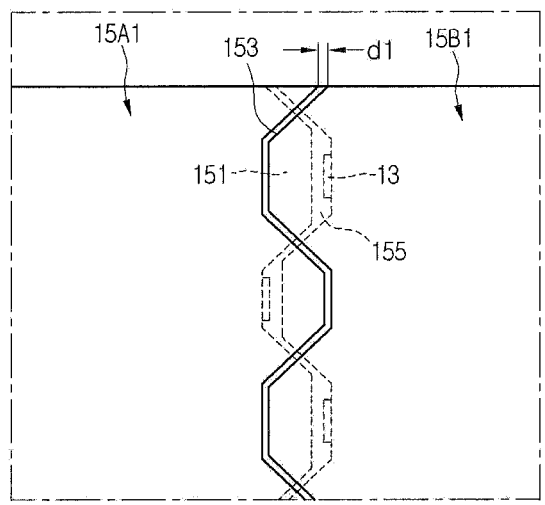
FIG. 9 is a schematic view illustrating a portion where the light guide plates of FIG. 8 face each other.

FIG. 9 is a schematic view illustrating a portion where the light guide plates of FIG. 8 face each other. Referring to FIG. 9, as described above, since the portions that neighboring ones of the light guide plates 15 engage with each other are spaced a predetermined distance from each other, a predetermined space (also denoted by d1) is formed between the light guide plates 15.

Since the shield part 153 of one of the light guide plates 15 alternately engages with the shield part 153 of adjacent one of the light guide plates 15, the space d1 may have a predetermined bent pattern when viewed from the backlight unit 100.

Since the brightness of light emitted through the space d1 is lower than the brightness of light emitted through the light guide plate 15, the space d1 forms a dark region.

Thus, a portion of the spread plate 220 corresponding to the space d1 is provided with an optical pattern region 222. The optical pattern region 222 is disposed at the space d1 and a surrounding of the space d1 and refracts light including a second direction component oriented in the second direction and emitted in a plurality of directions such that the second direction component is superior to other vector components of the light.

Hereinafter, the configuration of the spread plate 220 and the optical pattern region 222 will now be described in detail.

Figure 10:
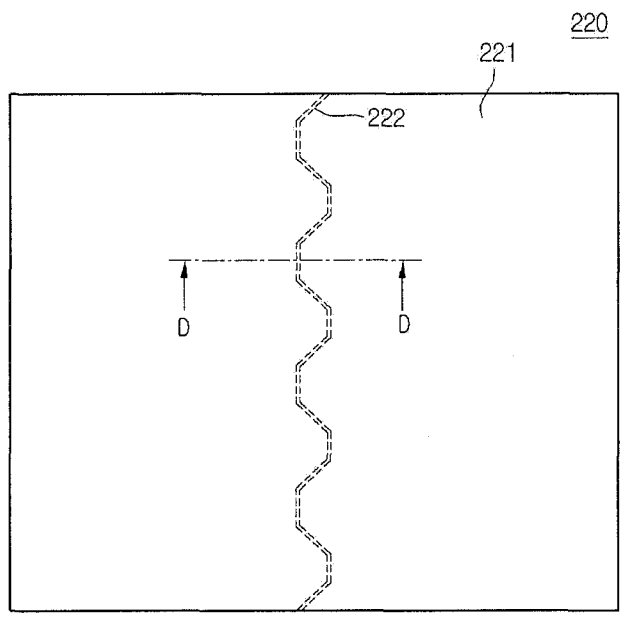
FIG. 10 is a bottom view illustrating the bottom surface of the spread plate of FIG. 8.
Figure 11:
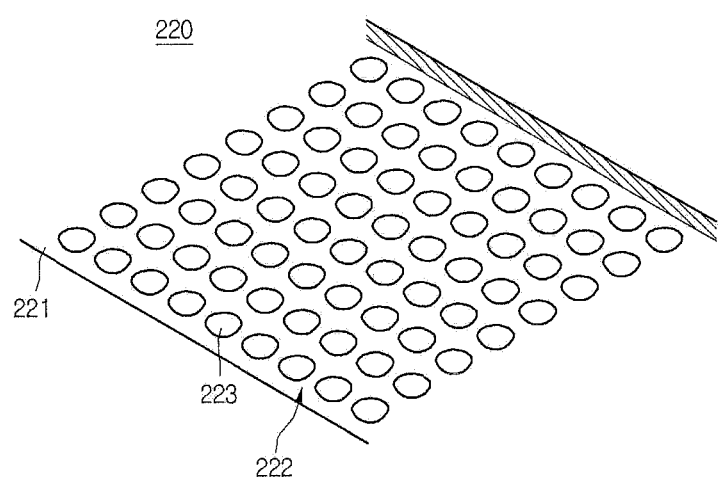
FIGS. 11 and 12 are a cut-away perspective view and a cross-sectional view taken along line D-D of FIG. 10.
Figure 12:
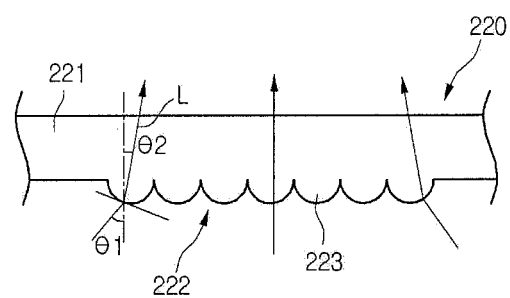

FIG. 10 is a bottom view illustrating the bottom surface of the spread plate 220 of FIG. 8. FIGS. 11 and 12 are a cut-away perspective view and a cross-sectional view taken along line D-D of FIG. 10.

Referring to FIGS. 8, 10, 11 and 12, the spread plate 220 includes a spread plate body 221 forming an appearance thereof, and the optical pattern region 222 disposed in a region of the spread plate body 221 corresponding to the upper side of the space d1 between the light guide plates 15.

The spread plate body 221 has a plate shape, which may be formed of a material having a predetermined transmissivity value, for example, polycarbonate, polysilicon, acrylic, or polymethyl methacrylate (PMMA).

The bottom surface of the spread plate body 221, that is, a surface of the spread plate body 221 facing the light guide plates 15 is provided with the optical pattern region 222 in which a plurality of optical units 223 corresponding to the space d1 of the light guide plates 15 are disposed.

The width of the optical pattern region 222 is equal to or greater than that of the space d1. The optical pattern region 222 may be bent in a predetermined pattern to correspond to the shape of the space d1 bent in a predetermined pattern.

The optical units 223 disposed in the optical pattern region 222, for example, may be convex toward the light guide plates 15, and have a hemisphere lens shape, and be integrally formed with the spread plate body 221.

For example, when the spread plate body 221 is an injection-molded product of synthetic resin, shapes corresponding to the optical units 223 corresponding to the optical pattern region 222 are formed in intaglio in a mold for forming the spread plate body 221, so that the spread plate body 221 can be integrally formed with the optical units 223 in a single process.

The light emitting part 157 of the light guide plate 15 emits light in the second direction, and the light may include a vector component corresponding to the second direction and other vector components.

The light is incident at a predetermined incident angle θ1 to the optical units 223, and is refracted at a predetermined refraction angle θ2 according to a refractivity difference between air and the light guide plate 15.

According to Snell's law, the refraction angle θ2 from a normal line to the spread plate body 221 is smaller than the incident angle θ1. That is, among the vector components of the light, the second direction vector component perpendicular to the spread plate body 221 is further increased.

Thus, the light is more dominantly spread in the second direction in the optical pattern region 222 provided with the optical units 223 than in other regions of the spread plate 220 without the optical pattern region 222.

As described above, although the brightness of the space d1 of the light guide plates 15 is lower than that of the surrounding, since the spread plate 220 is provided with the optical pattern region 222 disposed on the upper side of the space d1 and having the shape corresponding to the space d1, the darkness of the space d1 can be compensated for.

Thus, the brightness of light emitted from the backlight unit 100 may be uniform in the second direction.

The number of the optical units 223 arrayed in a predetermined region of the optical pattern region 222 may be varied according to a brightness variation of the space d1.

That is, when the brightness of the space d1 increases from the center of the space d1 to the periphery thereof, the number of the optical units 223 disposed in the optical pattern region 222, that is, a displacement density of the optical units 223 decreases from the center of the space d1 to the periphery thereof, so as to adjust an optical compensation amount with respect to the brightness of the space d1.

According to the embodiment, the module-type backlight unit including the light guide plates and the light sources configured to emit light to the light guide plates is used to provide light to the display panel. Thus, the thickness of a display apparatus can be decreased, and contrast of a display image can be improved using a local driving method such as a local dimming method and an impulsive method.

Since the backlight unit is driven using the local dimming method, the entire power consumption of the display apparatus can be reduced.

In addition, the brightness of light emitted to the dark region of the space formed by the light guide plates spaced a predetermined distance from one another is adjusted, the brightness of light provided by the backlight unit can be uniform.

Figure 13:
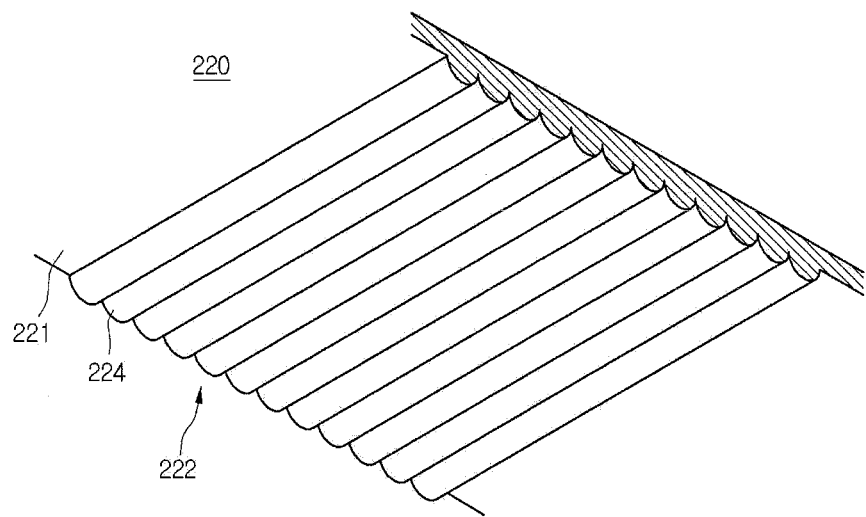
FIG. 13 is a schematic view illustrating a spread plate of a backlight unit according to an embodiment.
Figure 14:
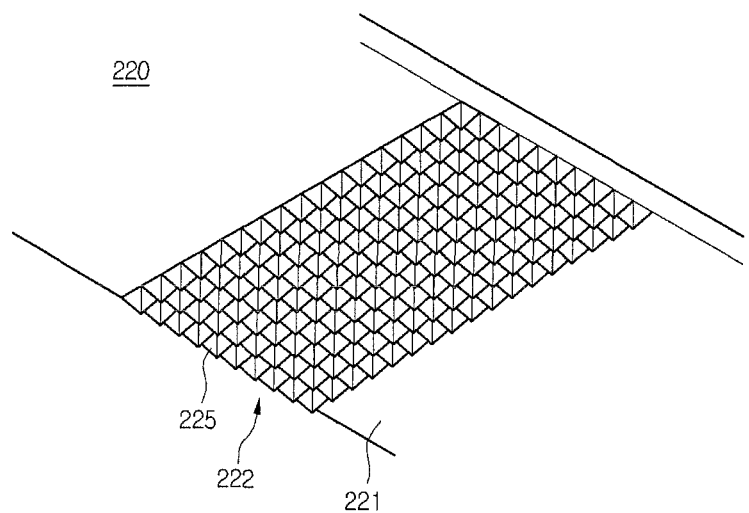
FIG. 14 is a schematic view illustrating a spread plate of a backlight unit according to another embodiment.

FIG. 13 is a schematic view illustrating a spread plate of a backlight unit according to an embodiment, and FIG. 14 is a schematic view illustrating a spread plate of a backlight unit according to another embodiment.

In the current embodiments, since other configurations except for the shapes of optical units provided to the spread plate are substantially the same as those of the backlight unit according to the first embodiment, characterized parts of the current embodiments will be principally described.

First, referring to FIG. 13, optical units 224 of the backlight unit according to the embodiment have a circular cross-section in a direction and a tetragonal cross-section in a perpendicular direction to the direction.

That is, the optical units 224 according to the current embodiment may have a semicircular column protruding in a round shape from the bottom surface of the spread plate 220 to the lower side, that is, to the light guide plate 15, and are continuously arrayed.

Next, referring to FIG. 14, optical units 225 of the backlight unit of the embodiment may have a square pyramid shape with a triangle cross-section, and may be continuously arrayed like the optical units 225.

Figure 15:
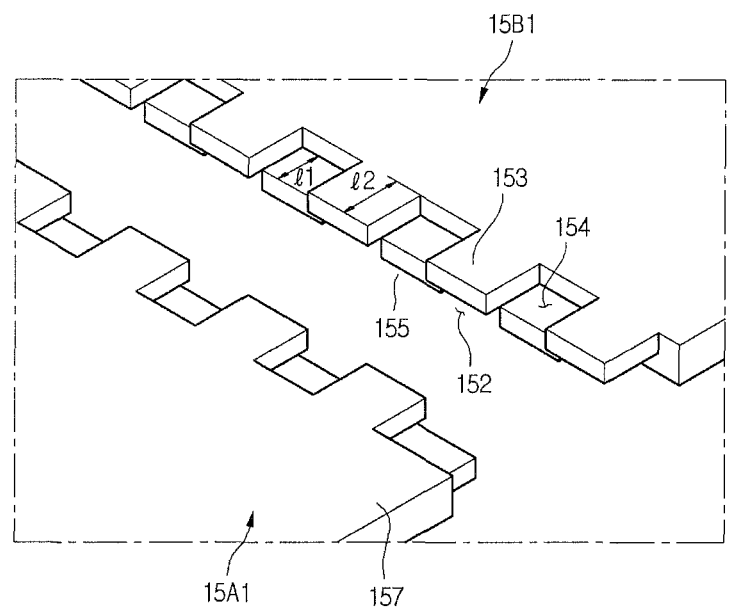
FIG. 15 is a schematic view illustrating a backlight unit including light guide plates coupled with each other, according to an embodiment.

FIG. 15 is a schematic view illustrating a backlight unit including light guide plates coupled with each other, according to an embodiment.

In the current embodiment, since other configurations except for the shapes of light incident parts and shield parts disposed at first sides of the light guide plates are substantially the same as those of the back light unit according to the first embodiment, characterized parts of the current embodiment will be principally described.

Referring to FIG. 15, the light incident part 151 and the shield part 153 of the light guide plates 15 according to the current embodiment have constant cross sectional sizes, regardless of distances from the first side of the light emitting part 157.

That is, while the light incident part 151 and the shield part 153 of the light guide plates 15 according to the first embodiment have a wedge shape that decreases in a cross section as it goes away from the first side of the light emitting part 157, the light incident part 151 and the shield part 153 according to the current embodiment have a rectangular shape with a constant cross-sectional size to engage with the light incident part 151 and the shield part 153 of another adjacent one of the light guide plates 15.

Figure 16:
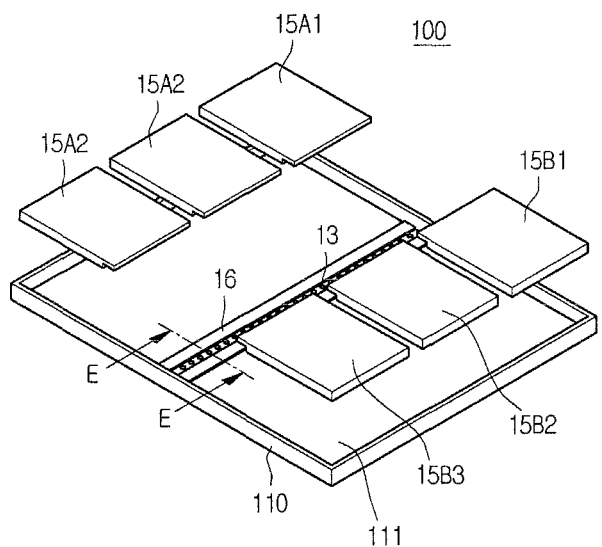
FIG. 16 is an exploded perspective view illustrating a backlight unit according to an embodiment.
Figure 17:
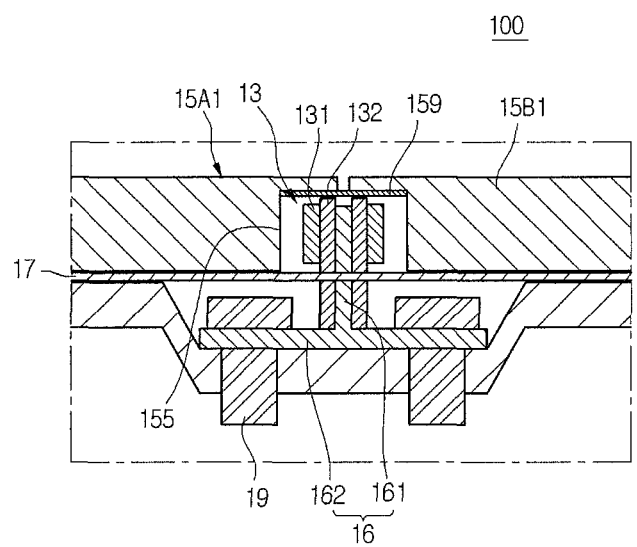
FIG. 17 is a cross-sectional view taken along line E-E of FIG. 16.

FIG. 16 is an exploded perspective view illustrating a backlight unit according to an embodiment, and FIG. 17 is a cross-sectional view taken along line E-E of FIG. 16.

In the current embodiment, since other configurations except for a displacement configuration of light sources and the shape of light guide plates are substantially the same as those of the back light unit according to the first embodiment, characterized parts of the current embodiment will be principally described.

Referring to FIGS. 16 and 17, the backlight unit 100 according to the current embodiment includes the light sources 13 that are arrayed in a single line at the central side of the receiving part 112 of the bottom cover 110.

The light guide plates 15 are symmetrically disposed with respect to the line in which the light sources 13 are arrayed.

In this case, the light sources 13 are fixed to the heat dissipation member 16 that extends in a shape corresponding to the line in which the light sources 13 are arrayed, and the heat dissipation member 16 is received in the recess part 113 of the bottom cover 110. The heat dissipation member 16 includes the bottom cover side fixation part 161 fixed to the bottom cover 110 through a coupling member 19, and the light source side fixation part 162 having surfaces protruding upward from the center of the bottom cover side fixation part 161. The light sources 13 are fixed to the surfaces of the light source side fixation part 162.

That is, the heat dissipation member 16 may have a 'T'-beam shape, which is symmetrical with respect to the light source side fixation part 162.

While the light sources 13 are alternately arrayed in the two lines in the backlight unit of the first embodiment, the light sources 13 of the backlight unit 100 according to the current embodiment may be disposed respectively on the two surfaces of the light source side fixation part 162 of the heat dissipation member 16 to emit light in opposite directions.

The light source side fixation part 162 may continuously extend along the line in which the light sources 13 are arrayed.

Figure 18:
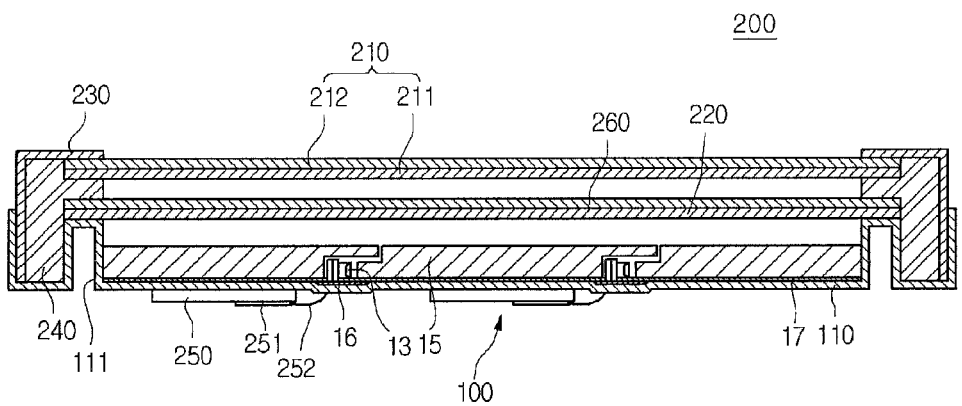
FIG. 18 is a cross-sectional view illustrating a display module according to an embodiment.
Figure 19:
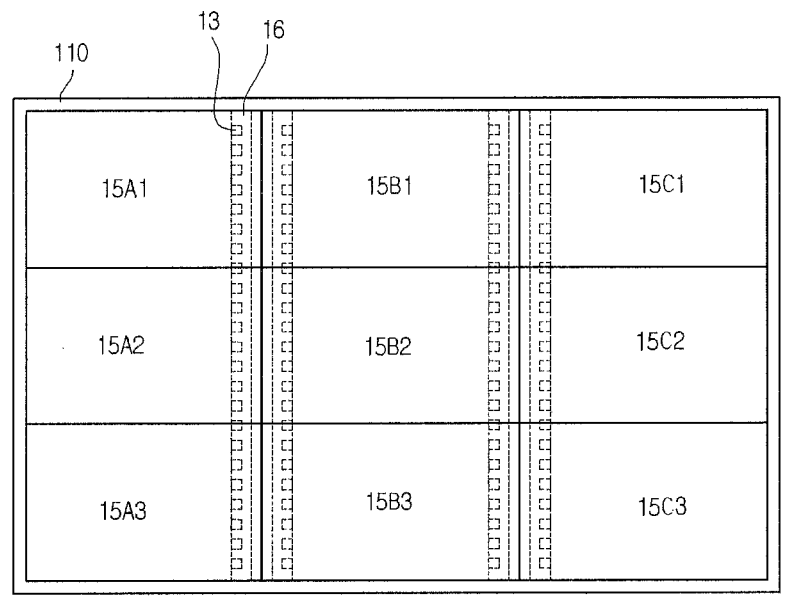
FIG. 19 is a plan view illustrating the display module of FIG. 18 when a liquid crystal panel is removed.

FIG. 18 is a cross-sectional view illustrating a display module according to an embodiment, and FIG. 19 is a plan view illustrating the display module of FIG. 18 when a liquid crystal panel is removed.

In the current embodiment, since other configurations except for a displacement configuration of a plurality of light sources and the shape of light guide plates are substantially the same as those of the back light unit according to the first embodiment, characterized parts of the current embodiment will be principally described.

Referring to FIG. 18, the light guide plates 15 disposed in the backlight unit 100 of the display module 200 according to the current embodiment include the first to ninth light guide plates 15A1 to 15C3 arrayed in three lines, unlike the light guide plates according to the first embodiment.

Thus, for example, the number of division driving areas of the backlight unit 100 according to the current embodiment is nine.

In this case, the light sources 13 and the heat dissipation members 16 are arrayed in a plurality of lines between the lines of the light guide plates 15.

According to the embodiment, the module-type backlight unit including the light guide plates and the light sources configured to emit light to the light guide plates is used to provide light to the display panel. Thus, the thickness of a display apparatus can be decreased, and contrast of a display image can be improved using a local driving method such as a local dimming method and an impulsive method.

Since the backlight unit is driven using the local dimming method, the entire power consumption of the display apparatus can be reduced.

In addition, the brightness of light emitted to the dark region of the space formed by the light guide plates spaced a predetermined distance from one another is adjusted, the brightness of light provided by the backlight unit can be uniform.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a plurality of light sources configured to emit light in a first direction;
   a plurality of light guide plates having first sides spaced a predetermined distance in the first direction from each other and facing each other, the light guide plates at least partially overlapping each other, the light emitted from the light source being incident in the first direction to the first side and emitted in a second direction crossing the first direction; and
   a bottom cover receiving the light source and the light guide plate,
   wherein the plurality of light guide plates include
   a plurality of light incident parts protruding at the first side of the light guide plate and spaced a predetermined distance from each other in a third direction crossing the first direction and the second direction, a first side of the light incident part being provided with a light incident surface facing a light emitting surface of the light source,
   a plurality of shield parts each protruding between neighboring two of the light incident parts, and
   a light emitting part extending from a second side of the light incident part to the second side of the light guide plate and emitting light, spread from the light incident part, in the second direction,
   wherein the plurality of light incident parts of one of the plurality of light guide plates are engaged with the plurality of light incident part of adjacent light guide plate, and the plurality of shield part of one of the plurality of the light guide plates are engaged with the plurality of shield parts of an adjacent light guide plate.

2. The backlight unit according to claim 1, wherein the second side of at least one of the light guide plates contacts the side border of the bottom cover.

3. The backlight unit according to claim 1, wherein the light sources are disposed between a space between two of the light guide plates.

4. The backlight unit according to claim 1, wherein a light emitting surface of one of the light sources faces the first side of a first one of the light guide plates, and the first side of a second one of the light guide plates is disposed at an inner side of the light source, and the second one at least partially overlaps the first one.

5. The backlight unit according to claim 1, wherein the light source is disposed at a central side of the bottom cover, and the light source emits light from the central side of the bottom cover to the side border of the bottom cover.

6. The backlight unit according to claim 1, wherein the light incident parts and the shield parts are disposed at different heights in the second direction, and the light incident parts are alternately disposed with the shield parts.

7. The backlight unit according to claim 6, wherein an extension length of the light incident part from the first side of the light guide plate is smaller than an extension length of the shield part from the first side of the light guide plate.

8. The backlight unit according to claim 6, wherein the light guide plates comprise a first light guide plate and a second light guide plate adjacent to the first light guide plate, and one of the light incident parts of the second light guide plate is disposed between neighboring light incident parts of the first light guide plate.

9. The backlight unit according to claim 8, wherein a shield part of the first light guide plate is disposed on a surface of the light emitting part of the second light guide plate disposed between the neighboring light incident parts of the first light guide plate.

10. The backlight unit according to claim 1, wherein opposing lateral surfaces of neighboring light incident parts are angled with respect to each other such that a distance between the light incident parts increases toward a distal end of the light incident parts.

11. The backlight unit according to claim 1, wherein the light guide plates comprise a first light guide plate and a second light guide plate adjacent to the first light guide plate, and at least one part of the light sources is disposed between a first side of the light emitting part of the first light guide plate and the light incident part of the second light guide plate facing the first side of the light emitting part.

12. The backlight unit according to claim 1, wherein the light guide plates are arrayed in at least two lines, and the light sources are arrayed in a plurality of lines corresponding to the lines in which the light guide plates are arrayed.

13. The backlight unit according to claim 12, wherein the light sources arrayed in a first line of the lines are disposed alternately with the light sources arrayed in a second line adjacent to the first line.

14. The backlight unit according to claim 13, wherein light emitted from the light sources arrayed in the first line corresponds to the light source disposed in the second line, and is incident to a light incident part of the light guide plate between two of the light sources arrayed in the second line.

15. The backlight unit according to claim 12, wherein the light sources arrayed in a line and the light sources arrayed in another line adjacent to the line emit light in different directions.

16. The backlight unit according to claim 1, wherein the light sources comprise a light emitting diode.

17. The backlight unit according to claim 1, further comprising a heat dissipation member having a first side fixed to the bottom cover and a second side to which the light sources are fixed.

18. The backlight unit according to claim 17, wherein the heat dissipation member comprises:
a bottom cover side fixation part fixed to the bottom cover; and
a light source side fixation part to which the light source is fixed, the light source side fixation part being bent from the bottom cover side fixation part.

19. The backlight unit according to claim 1, wherein the backlight unit is divided into a plurality of division driving areas corresponding to the light guide plates, and brightness of each of the division driving areas is adjusted according to brightness corresponding to an image signal or a color coordinate signal.

20. The backlight unit according to claim 1, further comprising a spread plate spaced a predetermined distance in the second direction from a surface of the light guide plate through which light is emitted, the spread plate having an optical pattern region corresponding to a space between the light guide plates.

21. The backlight unit according to claim 20, wherein the spread plate comprises a plurality of optical units disposed in the optical pattern region.

22. The backlight unit according to claim 21, wherein the optical unit protrudes from a surface of the spread plate to the light guide plate.

23. The backlight unit according to claim 22, wherein the optical unit has a hemisphere shape with a semicircular cross section, and protrudes from the surface of the spread plate.

24. The backlight unit according to claim 21, wherein a displacement density of the optical units disposed in the optical pattern region decreases in a direction going away from a central portion of the optical pattern region.

25. A display apparatus comprising:
a display panel;
a backlight unit disposed at a rear side of the display panel and including a plurality of separately drivable driving areas; and
a driving part driving at least one of the display panel and the backlight unit and disposed at a rear side of the backlight unit,
wherein the backlight unit includes:
a plurality of light sources configured to emit light in a first direction;
a plurality of light guide plates having first sides spaced a predetermined distance in the first direction from each other and facing each other, the light guide plates at least partially overlapping each other, the light emitted from the light source being incident in the first direction to the first side and emitted in a second direction crossing the first direction; and
a bottom cover receiving the light source and the light guide plate,
wherein the plurality of light guide plates include a plurality of light incident protrusions that protrude from the light guide plate and a plurality of light shield protrusions that protrude from the light guide plate,
wherein the plurality of light incident protrusions of one of the plurality of the light guide plates are engaged with the plurality of light incident protrusion of an adjacent light guide plate, and the plurality of shield protrusions of one of the plurality of the light guide plates are engaged with the plurality of shield protrusions of an adjacent light guide plate.

26. The display apparatus according to claim 25, further comprising a spread plate spaced a predetermined distance in the second direction from a surface of the light guide plate through which light is emitted, the spread plate having an optical pattern region corresponding to a space between the light guide plates.

\* \* \* \* \*